United States Patent
Sung et al.

(10) Patent No.: US 7,570,819 B2
(45) Date of Patent: Aug. 4, 2009

(54) METHOD AND APPARATUS FOR DISPLAYING IMAGES WITH COMPRESSION MECHANISM

(76) Inventors: Chih-Ta Star Sung, Rm. 308, Bld. 52, No. 195, Chung Hsing Rd., Sec. 4, Chu Tung Township, Hsinchu County, 310 (TW); Yin-Chun Lan, Rm. 308, Bld. 52, No. 195, Chung Hsing Rd., Sec. 4, Chu Tung Township, Hsinchu County, 310 (TW)

(*) Notice: Subject to any disclaimer, the term of this patent is extended or adjusted under 35 U.S.C. 154(b) by 910 days.

(21) Appl. No.: 11/044,255

(22) Filed: Jan. 28, 2005

(65) Prior Publication Data
US 2006/0171596 A1   Aug. 3, 2006

(51) Int. Cl.
*G06K 9/36* (2006.01)
(52) U.S. Cl. .................. 382/232; 382/233; 382/241; 382/298
(58) Field of Classification Search ............ 382/232, 382/233, 244, 245, 246, 247, 166, 241, 197, 382/298; 345/501, 572, 537, 556, 560; 709/236; 712/1, 200; 358/450, 452; 375/E7.088, E7.133
See application file for complete search history.

(56) References Cited

U.S. PATENT DOCUMENTS

| | | | |
|---|---|---|---|
| 5,434,913 A * | 7/1995 | Tung et al. ............. 379/202.01 |
| 5,488,570 A * | 1/1996 | Agarwal ..................... 345/501 |
| 5,506,954 A * | 4/1996 | Arshi et al. ................. 345/501 |
| 5,694,486 A * | 12/1997 | Shigeeda et al. ............ 382/197 |
| 5,805,914 A * | 9/1998 | Wise et al. .................. 382/232 |
| 5,881,301 A * | 3/1999 | Robbins ....................... 712/1 |
| 6,038,380 A * | 3/2000 | Wise et al. .................. 712/200 |
| 6,125,398 A * | 9/2000 | Mirashrafi et al. .......... 709/236 |
| 6,731,293 B2 * | 5/2004 | Tojima et al. ............... 345/537 |
| 6,760,483 B1 * | 7/2004 | Elichai et al. ............... 382/241 |
| 7,236,177 B2 * | 6/2007 | Sih et al. .................... 345/572 |

* cited by examiner

*Primary Examiner*—Anh Hong Do

(57) ABSTRACT

A codec device is disposed in a display control device for instantly supplying decompressed image data to manipulating devices in the display control chip. Reference images are stored in compressed format after instantly compressed by the codec device. In addition, MSB portions and LSB portions are separately compressed for gaining higher compression ratio. Predication of the pixel value is also modified in variable length coding. On-chip line buffer is also applied with the instant compression mechanism. Fixed compression ratio is predetermined to actually downsize the chip design for the worst case.

21 Claims, 15 Drawing Sheets

METHOD AND APPARATUS FOR DISPLAYING IMAGES WITH COMPRESSION MECHANISM

BACKGROUND OF THE INVENTION

1. Field of Invention

The present invention relates to apparatus for displaying images, and particularly relates to apparatus for displaying images with compression mechanism.

2. Description of Related Art

With top image quality in display, the LCD, Liquid Crystal Display has become prevailing popular in mass applications including monitor, screen of note book computer, display screen of mobile phone, PDA, GPS, e-dictionary, . . . etc. Digital TV and HDTV are adopting LCD display as its display screen. The digital image and motion video have been adopted in an increasing number of applications, which include digital camera, scanner/printer/fax machine, video telephony, videoconferencing, surveillance system, VCD (Video CD), DVD, digital TV . . . etc. The success of development of the digital image and video compression standards fuels wider applications in digital display devices.

FIG. 1(a) is a diagram of a display system. In the display system, an image source device 10, e.g., a MPEG/JPEG decoder, supplies one or a series of raw image(s) to a display control chip 12. The display control chip 12 adapts the raw image(s) and supplied adapted image(s) at right timing to a display driver device 14 that renders an output image on a display device 18, e.g., a LCD panel. For adapting the raw image(s) to the display device 18, the display control chip 12 has a control logic unit 120 and several manipulating devices. In this example, the display control chip 12 has a de-interlacer 124 and a scaler 126.

The de-interlacer 124 de-interlaces interlaced images into a restored image. For example, in MEPG2 standard, odd lines and even lines of an image are interlaced and separately compressed and therefore, a de-interlacer 124 is necessary for restoring two portions of an image into one complete image. To improve the image quality when concatenating two separately compressed portions, the de-interlacer 124 needs to reference to at least 4 corresponding images, e.g. previous frames. In fact, some de-interlacer 124 needs 6-8 reference images to achieve better image quality. A cache 122 is embedded in the display control chip 12 for temporarily storing operation data. However, one or more off-chip memory 16 is usually necessary for storing reference images. A memory interface 128 of the display control chip 12 is therefore disposed for accessing the off-chip memory 16.

Because the de-interlacer 124 needs to access reference frames so frequently, the channel between the display control chip 12 and the off-chip memory 16 needs high bandwidth, which consumes higher power and complicates the design of the display system. In addition, the de-interlacer 124 and the scaler 126 usually needs to reference 4-10 lines during operation. The on-chip cache 122 usually dominates 30% area of the display control chip 12, which is around 750K logic gates under 0.25 um CMOS process. Therefore, the size of the on-chip cache 122 is also a cost factor of designing the display control chip 12.

FIG. 1(b) illustrates a diagram illustrating the relationship of the display driver 14 and the display device 18. The display driver 14 has a plurality of column drivers 17 and row drivers 19 for providing driving currents to the display device 18 for rendering output images thereon. In general application like LCD displays, the display driver device 14 is designed as a couple of driver chips that read a memory buffer storing the output image to be displayed. Though the display control chip 12 has dealt with the timing, the display driver 14 needs a frame buffer that stores the output image. The frame buffer is also a cost factor during designing the display system.

For mobile phones or other portable devices, a single chip deals with functions provided by both the display control chip 12 and the display driver device 14. In such application, the frame buffer in the display driver device 14 mentioned above is particularly a critical issue to be addressed.

Therefore, it is very beneficial to improve the display system to downsize both the on-chip cache and the off-chip memory while keeping same image quality.

SUMMARY OF THE INVENTION

The present invention is related to a method and apparatus of the image buffer compression of the display device, which plays an important role in image data reduction, specifically in compressing the frame buffer image of the display device driver, display device controller and line image buffer within the display device controller. The present invention significantly reduces required storage device density and accessing bandwidth of the image within the storage device.

The present invention of the image compression compresses the image data of display driver before storing the image data into a frame buffer which significantly reduces the density, bandwidth requirement and power consumption of storage device.

The present invention of the image compression compresses the image data of display device controller which functions as timing controller, scaler and de-interlacing engine before storing the image data into a frame buffer.

The present invention of the image compression compresses the on-chip image line buffer of display device controller which lines are used for scaling and de-interlacing.

The present invention of the image compression includes procedures and apparatus of compressing the image data by a procedure of separating the MSB bits and LSB bits of the DPCM coded pixels difference between adjacent pixels.

According to an embodiment of the present invention of the image buffer compression, MSB bits are screened to determine whether the MSB and LSB bits are compressed separately to gain higher compression rate.

The present invention of the image compression detects the variance of MSB bits of the DPCM code and determines whether the MSB and LSB bits to be compressed separately or not.

The present invention of the image buffer compression detects the the variance of MSB bits of the DPCM code by comparing the values of difference between adjacent pixel, if the DPCM value is "0", the possibility of high similarity of adjacent pixels is high.

According to an embodiment of the present invention of the image buffer compression, when MSB bits of the DPCM code has continuous "0s" which means high similarity of adjacent pixels and the corresponding LSB bits will be re-ordered and be compressed by a VLC coding, the rest of LSB bits will be coded by either distributed truncation or by keeping original values.

According to an embodiment of the present invention of the image buffer compression, the MSB bits within a compression block of the DPCM code will be coded by a VLC coding algorithm.

According to an embodiment of the present invention, a couple of pixel of top line and left pixel are applied to predict the value of the targeted pixel.

According to an embodiment of the present invention of the image buffer compression, the re-ordered LSB bits with high potential of similarity within a compression block of the DPCM code will be coded by a VLC coding algorithm.

According to an embodiment of the present invention of the image buffer compression, re-ordering of the LSB bits is done by referring to the MSB bits by gathering LSB bits together for MSB bits having values of "continuous 0s". If no continuous 0s are found, the LSB bits will be compressed by a VLC coding algorithm.

According to an embodiment of the VLC coding algorithm of the MSB, LSB or the re-ordered DPCM codes of the present invention of the reference image buffer compression, only the "Quotient" and "Remainder" are coded with the "Divider" implicitly done by prediction.

According to an embodiment of the VLC coding algorithm of the MSB, LSB or the re-ordered DPCM codes of the present invention, the "Quotient" is coded by a prediction means.

According to an embodiment of truncation of LSB or the re-ordered DPCM codes of the invention, if the MSB bit of the bits to be truncated is "1", it will be carried to the next more significant bit, if "0", it will be directly discarded.

According to an embodiment of the present invention of the image compression, the distribution of truncating bits will not start from the same position hence avoid accumulation of error over time.

According to an embodiment of the present invention of the image compression, the block size of pixels are tradeoffs among compression rate, image quality, latency of accessing and ease of design.

According to an embodiment of the present invention of the image compression, under the requirement of a fixed compression rate, the bit rate of Y (Luma) and UN (Chroma) are put together as a compression unit in allocating the bit rate distribution and truncation.

According to an embodiment of the present invention of the image compression, adaptively change the block size from block to block is applied to achieve higher performance and still maintain high compression rate and good quality.

According to an embodiment of the present invention of the image compression, lossless compression is applied to a certain of lines of a frame as references for adjacent lines of pixels in determining the compression rate of each line of pixels.

According to an embodiment of the present invention, a counter is applied to calculate and trace the compression rate of each line of a frame of pixels to ensure the fixed compression rate. When the accumulated compression rate of a certain of lines reached a value behind a preset target, higher compression rate will be applied to the next line or a couple of lines to gradually pull back the compression rate.

It is to be understood that both the foregoing general description and the following detailed description are by examples, and are intended to provide further explanation of the invention as claimed.

DESCRIPTION OF THE PREFERRED EMBODIMENTS

Figure 2:
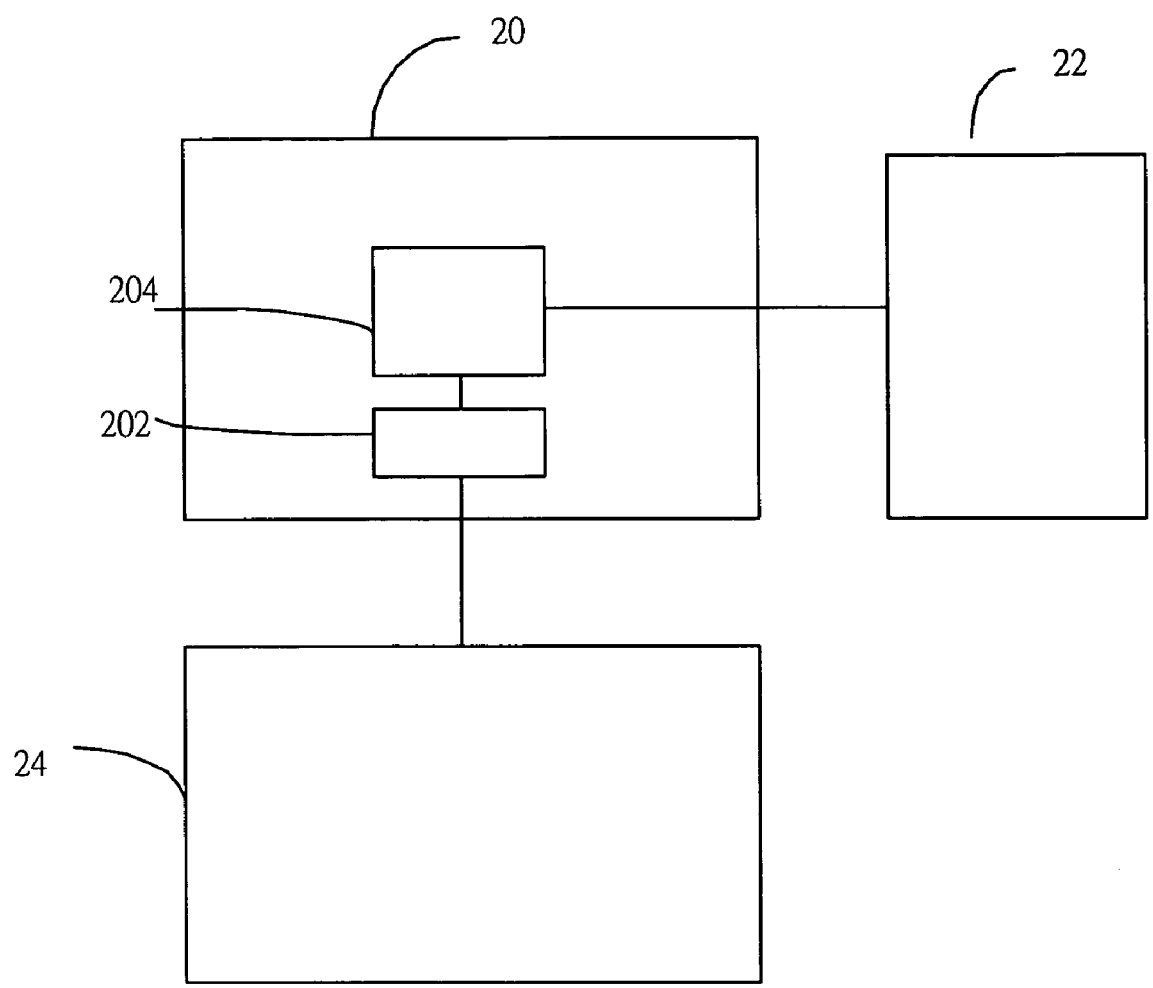
FIG. 2 illustrates a preferred embodiment according to the present invention.

FIG. 2 is a diagram illustrating a preferred embodiment according to the present invention. A display processing apparatus 20 is designed for adapting one or more raw image(s) for displaying on a display apparatus 22. For example, the raw image(s) comes from a MEPG/JEPG decoder and the display apparatus 22 is a LCD display. The display processing apparatus 22 has a frame codec device 202 for compressing the raw image(s) to generate an associated compressed image to be stored in at least one buffer apparatus 24 that is coupled to the display processing apparatus 22. The display processing apparatus 22 also has one or more manipulating device(s) 204 for generating an output image adapted to be display on the display apparatus according to a decompressed image from the frame codec device 24 by decompressing the compressed image.

Figure 1A:
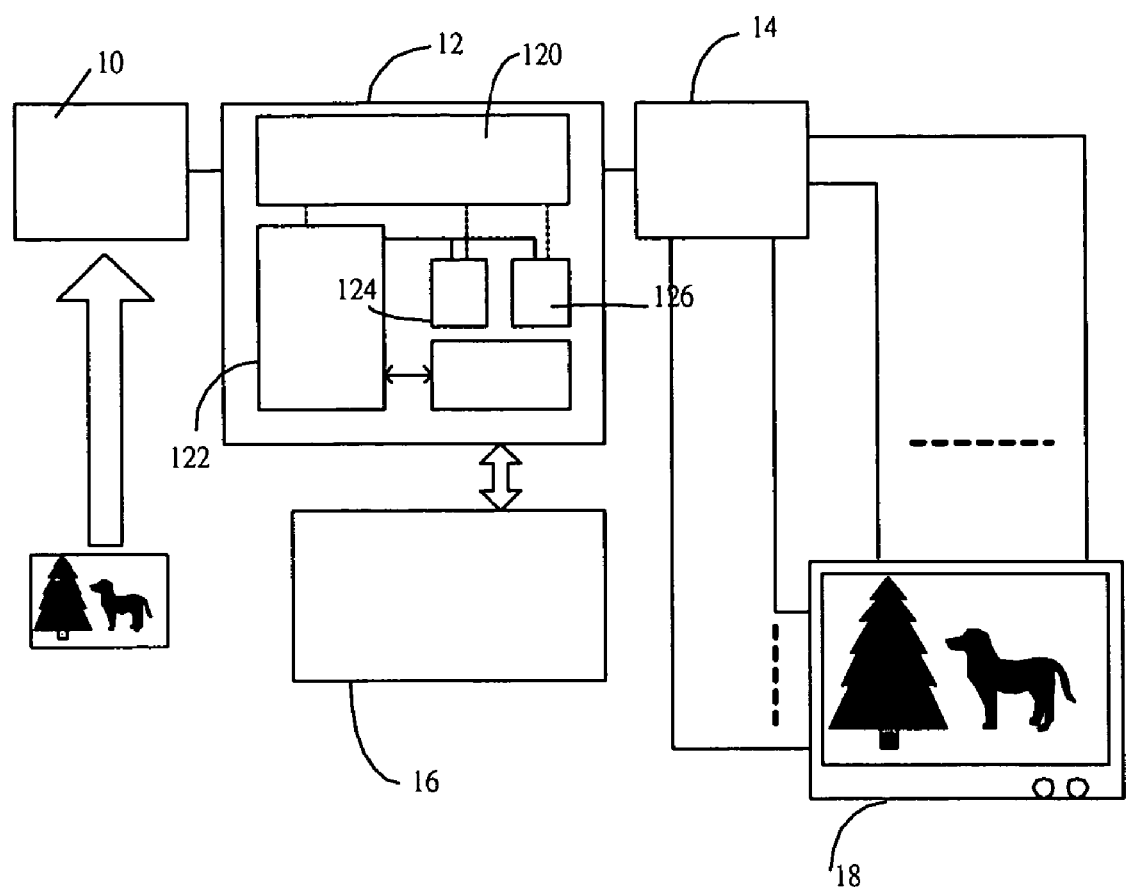
FIG. 1(a) illustrates a known display system.
Figure 1B:
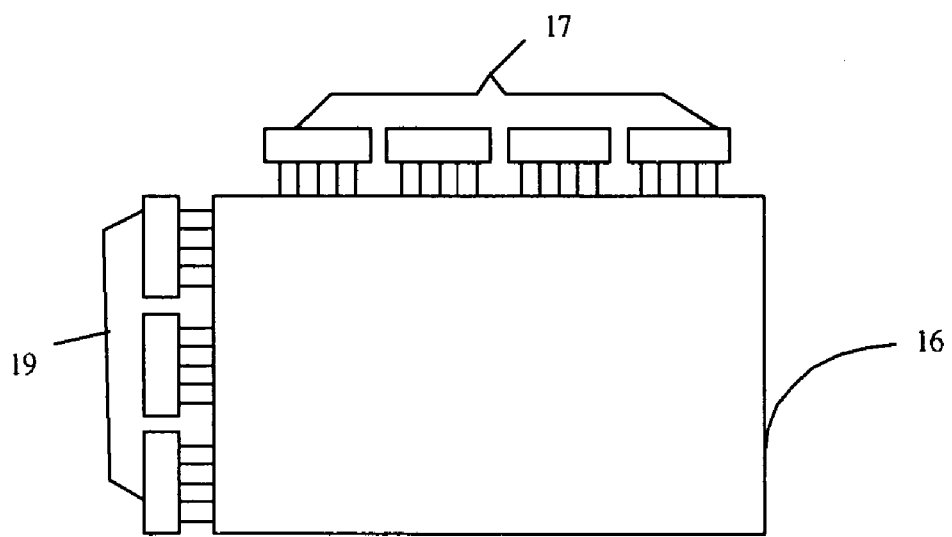
FIG. 1(b) illustrates a known display driving mechanism.

In one exemplary implementation of the preferred embodiment, the display processing apparatus 20 is designed as a chip and the buffer apparatus 24 is another chip. In such implementation, the display processing apparatus 20 serves as the display control chip 12 illustrated in FIG. 1(a). Bandwidth between the display processing apparatus 20 and the buffer apparatus 24 are largely reduced because of data compression. Meanwhile, the size of the buffer apparatus 24 is reduced for reducing the manufacturing cost. Further, power consumption is also reduced.

In another exemplary implementation of the preferred embodiment, the display processing apparatus 20, the buffer apparatus 24, a plurality of row drivers and a plurality of column drivers are integrated as a chip. In such implementation, the chip can be designed with smaller size of die and lower power consumption, which is particularly suitable in applications like PDAs, mobile phones and other portable devices.

More detailed structure and enhancement for the two implementations are explained below.

Figure 3A:
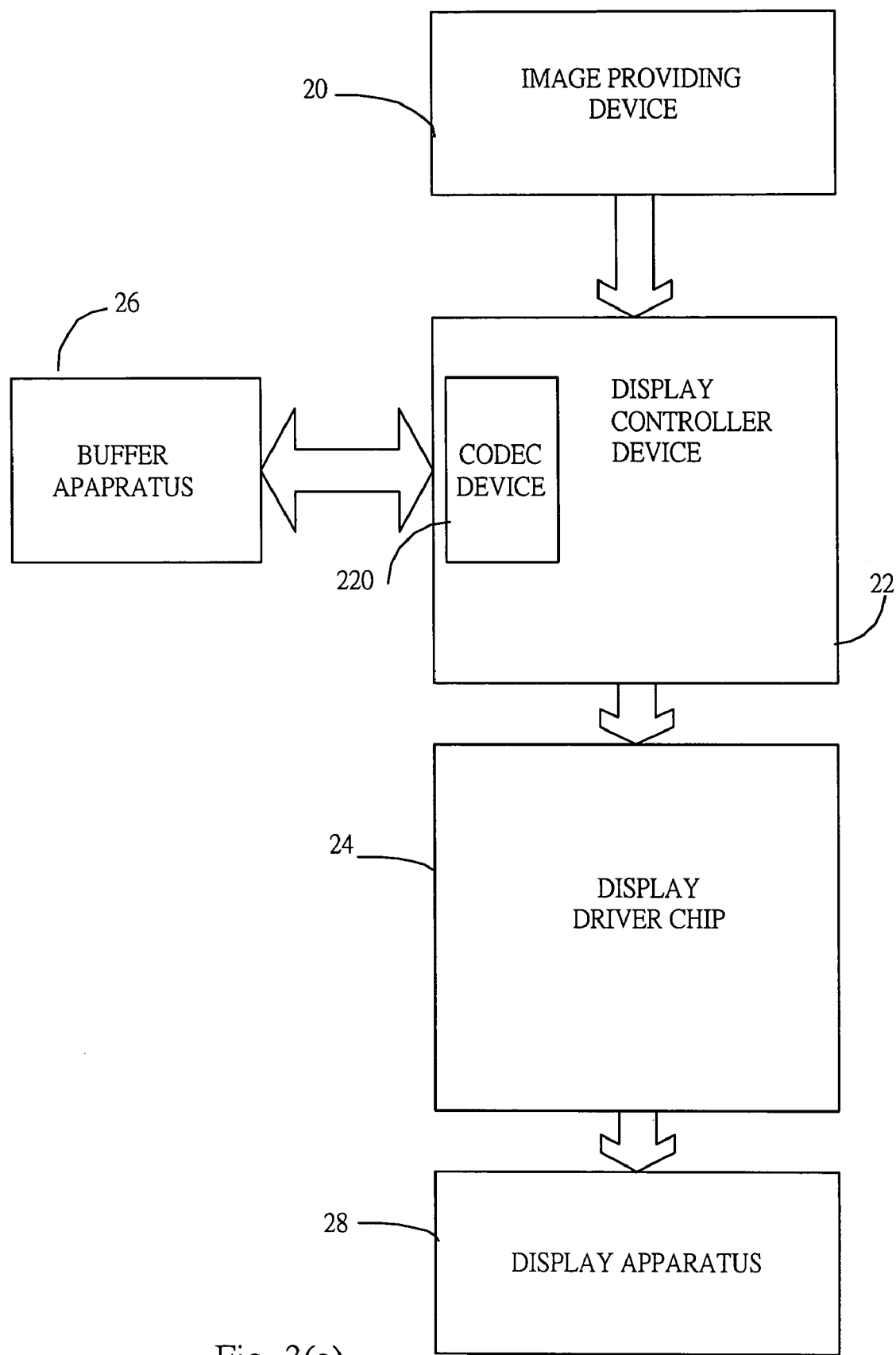
FIG. 3(a) illustrates an exemplary implementation of the preferred embodiment.
Figure 3B:
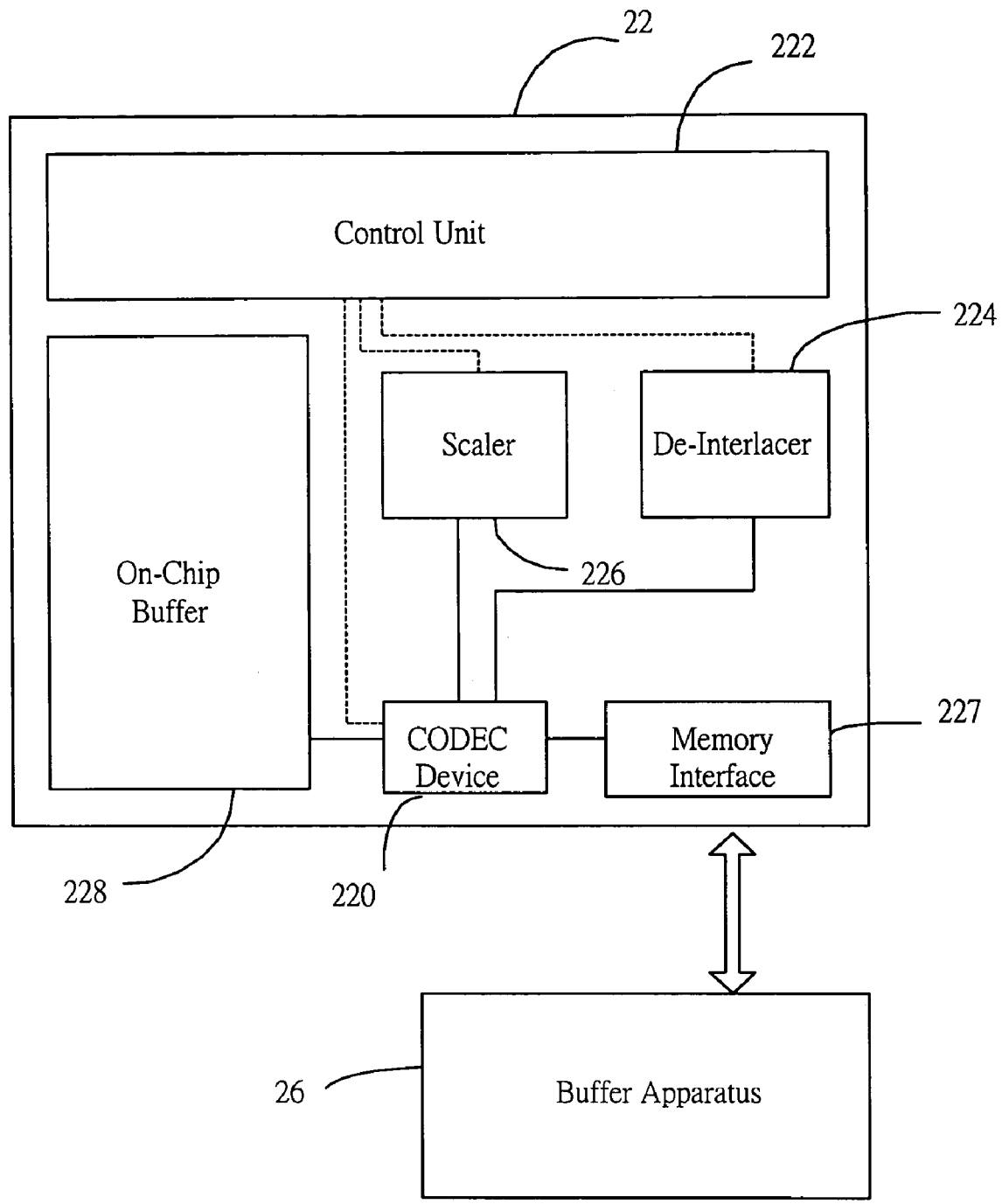
FIG. 3(b) illustrates a detailed diagram of a component in FIG. 3(a)

FIGS. 3(a) and 3(b) illustrates an example of a display system for the first exemplary implementation. In the display system, a display control device 22 is coupled to an image providing device 20, a display driver device 24 and a buffer apparatus 26. The display control device 22 is a display processing apparatus that manipulates one or more raw image(s) supplied by the image providing device 20, e.g., a MEPG/JPEG decoder. The adapted image(s) are then supplied to the display driver device 24 that renders an output image on the display apparatus like LCD panel.

The display control device 22 has a codec device 220 that automatically compresses raw image(s) or other reference image(s) into the buffer apparatus 26. Also, the codec device 220 provides decompressed data to be used by one or more manipulating device(s) of the display control device 22.

FIG. 3(b) illustrates a more detailed diagram of the display control device 22 that has a control unit 22, a de-interlacer 224, a scaler 226, a memory interface 227, a codec device 220 and an on-chip buffer 228. The de-interlacer 224 and the scaler 226 are two manipulating devices for adapting the raw image(s) to be suitable as being displayed on the display apparatus 28. Functions of the control unit 222 includes controlling the timings of outputting images to the display driver chip 24, generating control signals for operating the display control chip. The memory interface 227 is used for writing data into the buffer apparatus 26 and reading data from the buffer apparatus 26. It is to be noted that FIG. 3(b) is used for illustration, not to limit the actual design of the display control device 22. For example, the scaler 226, de-interlacer 224, the control unit 224 and the codec device 220 can be implemented as hardware logic or firmware architecture, which processing logic is written as codes to be processed by a processing unit.

Figure 4:
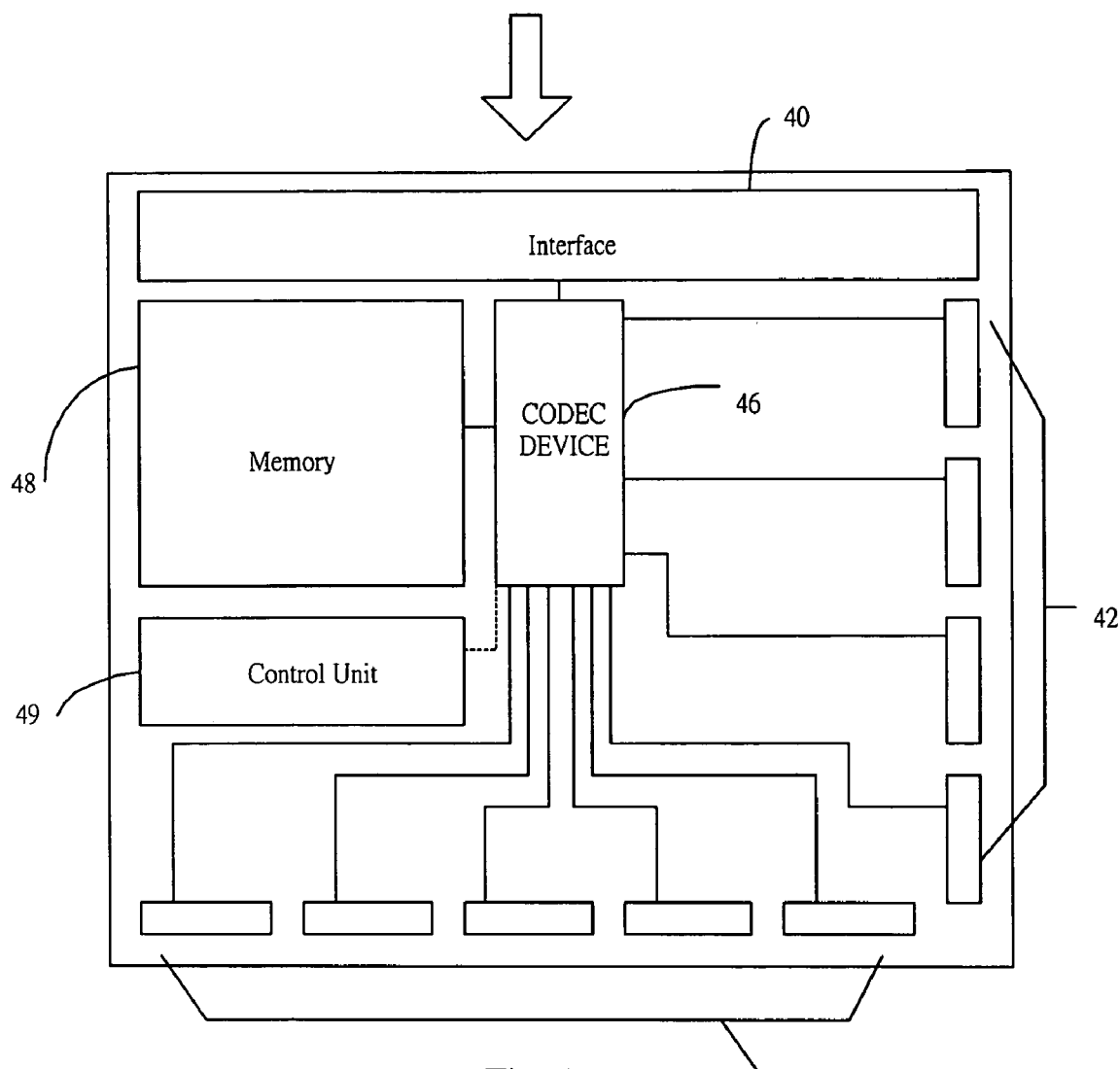
FIG. 4 illustrates another exemplary implementation of the preferred embodiment.

FIG. 4 illustrates an example of a display processing apparatus for the first exemplary implementation. The display processing apparatus has an interface 40, row drivers 42, column drivers 44, a codec device 46, a memory 48 and a control unit 49 and can be integrated as a chip used in portable devices. The interface 40 is used for receiving one or more raw image(s); the raw image(s) are stored in the memory 48 as a compressed format by using the codec device 46; the control unit 49 controls the column drivers and row drivers to show pictures on a display panel based on decompressed image(s) from the memory 48 via the codec device 46.

After describing basic structure of the embodiment, we will explain details and enhancements for the implementations, particularly the compression skills adopted.

Firstly, the raw image is composed of a plurality of lines, each line is composed of a plurality of blocks, and each block is composed of a plurality of pixels. In compression, proper pre-processing to the raw image improves compression ratio significantly. In other words, with pre-processing, intermediate data calculated based on the raw image have higher data resemblance, which improves the compression.

Figure 5A:
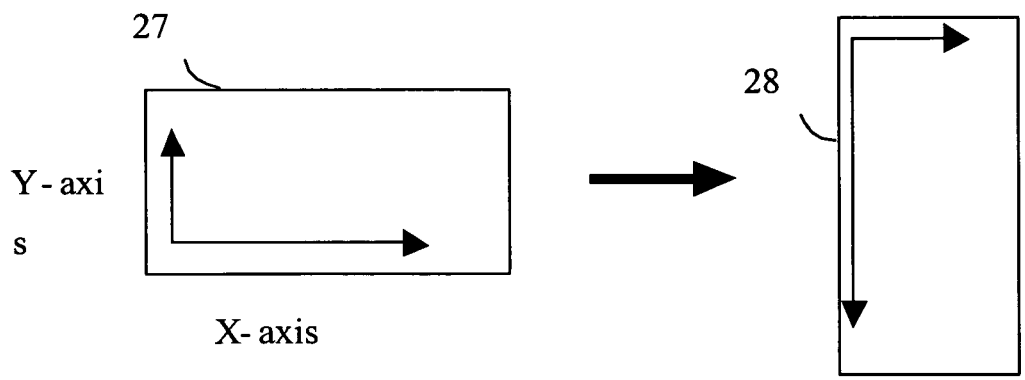
FIG. 5(a) illustrates an example of pre-processing.

FIG. 5(a) illustrates a raw image that has a X-axis and a Y-axis. If the aforementioned codec device finds that image data in the direction of Y-axis has larger resemblance than in the direction of X-axis, the raw image is rotated for obtaining higher compression ratio. The rotation of the raw image is an example of the pre-processing. However, the rotation does not have to really transform the raw image. Such rotation can be done by changing a reading order of the raw image.

Figure 5B:
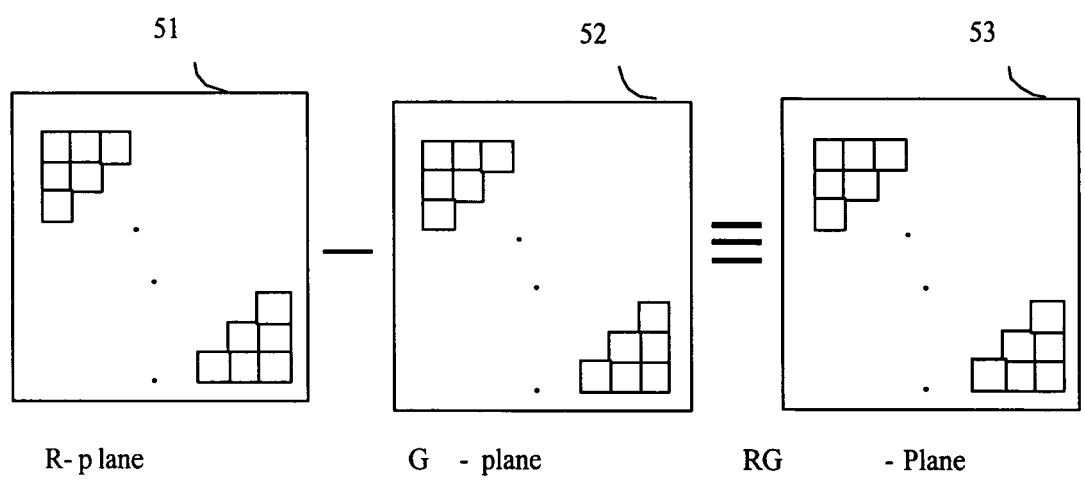
FIG. 5(b) illustrates another example of pre-processing.
Figure 5B:
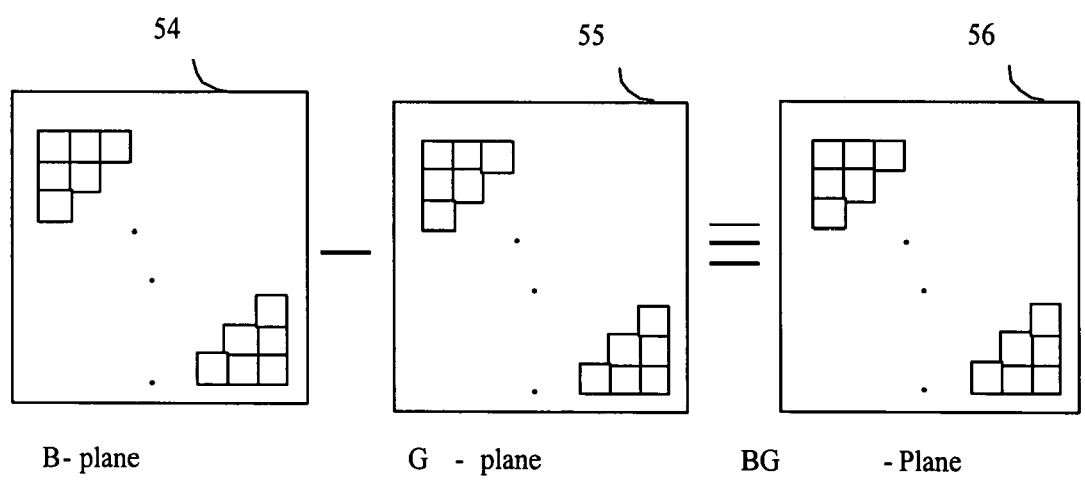

FIG. 5(b) illustrates another kind of pre-processing, i.e., calculating differential values of color attributes of a pixel to be the intermediate data for compression. In most display device drive like LCD driver, Red, Green and Blue are commonly used three color components which are used to represent colors of bit map of a frame of pixels. FIG. 5 illustrates the procedure of how the differential values between Red, Green and Blue planes are generated. G-plane 52 is used as a reference, and subtracting from Red-plane 51 results in the differential plane of RG-plane 53. Another G-plane 54 as another reference, subtracting from Blue-plane 55 results in the differential plane of BG-plane 56. The values of differential planes 53, 56 are DPCM coded first before further compression steps which are part of this invention and are described in the following paragraphs.

There are other pre-processing skills can be applied in the compression. For example, differential values among adjacent pixels are used to generate the intermediate data. Or, a block of pixels are subtracted by a reference pixel or an average value of the block of pixels to generate differential values to be used for generating the intermediate data. The enhance such skill in the pre-processing, the reference value between two adjacent blocks is shared by the two adjacent blocks of pixels. Also, Discrete Cosine Transform(DCT) and quantization used in image compression can also be used in the pre-processing.

Usually, images are compressed in blocks. To achieve even better enhancement of pre-processing, block size for compression can be dynamically changed during compression. Also, each pixel can be represented in attributes of one color space, e.g., YUV space or RGB space. Different compression ratios can be predetermined on compressing different color attributes.

After various pre-processing skills are applied, pixels in a block of the intermediate data have higher resemblance. Further, it is noted that MSB (most significant bits) portions of pixels in a block have even higher resemblances or the same to each other while the difference between pixels are mostly in the LSB (least significant bits) portions. The MSB portion of a pixel is the bits with higher order and the LSB portion of a pixel is the bits with lower order. For example, if a pixel is represented in 8 bits, the left four bits are the MSB portion and the right four bits the LSB portion. However, the MSB portion can be defined as the left 5 or 3 or any suitable number of bits with higher order and the LSB portion are the rest part of the pixel data.

Based on such findings, the codec device is equipped with a mechanism to separate MSB portions and LSB portions of data to be compressed for further improving the total compression ratio. However, the variance of the MSB portion may also be checked to determine whether to combine or separate the MSB portions and the LSB portions during compression. When the intermediate data are the target to be compressed, there are many values in the MSB portions are zeros. An easy way to determine the variance of the MSB portions is to count how many zeros appear in the MSB portions. For example, if the MSB portion of a block has 16 pixels and there are 12 zeros found in the MSB portion, it is suitable to separate the MSB portion and the LSB portion for compression.

An even better enhancement to the above skill is to regroup units of LSB portions based on associated units of MSB portions. This is because the pixels have the same or similar MSB values usually have same or similar LSB values.

Figure 6:
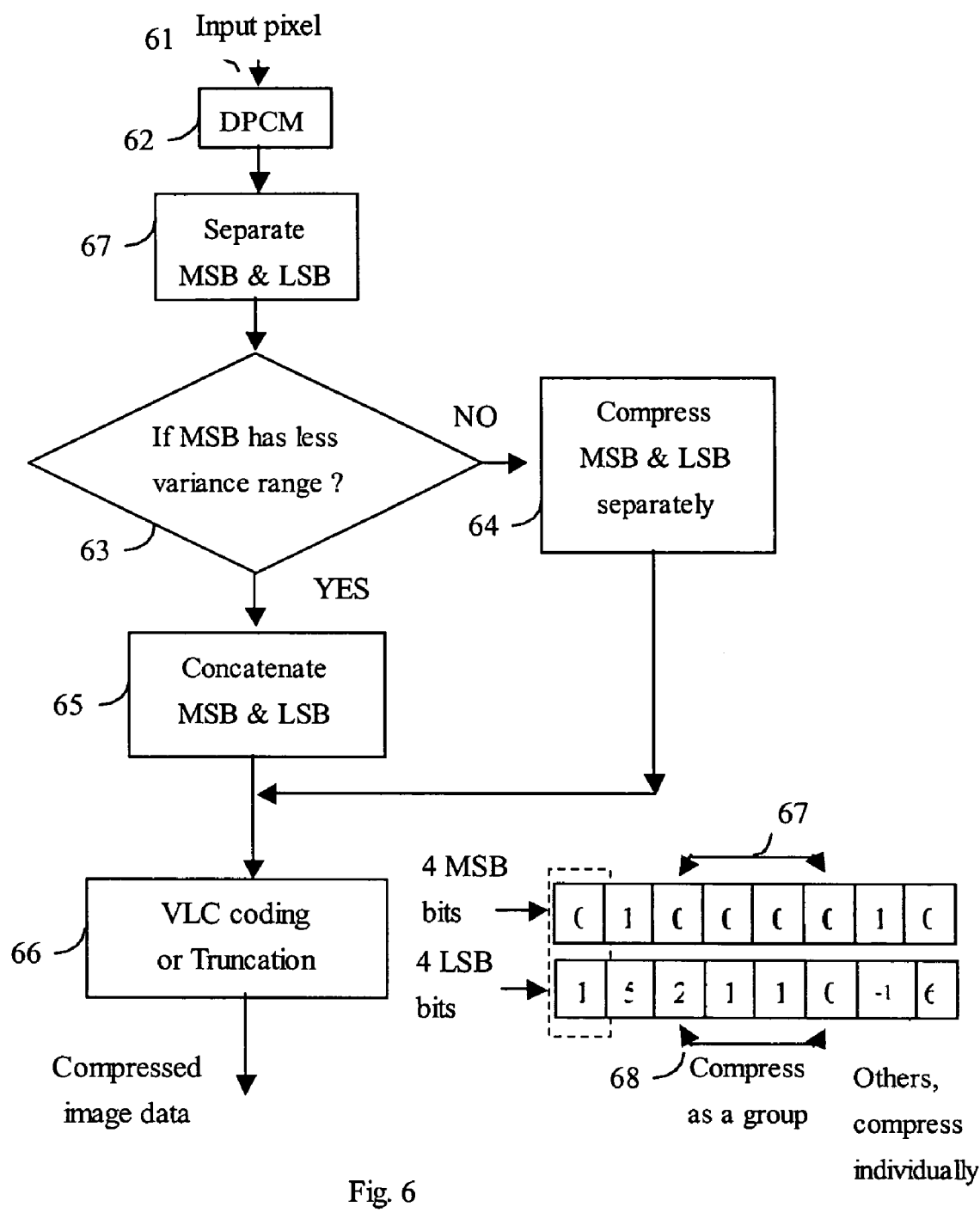
FIG. 6 is a flowchart illustrating an example of image compression.

FIG. 6 depicts the flowchart of the present invention of image compression and deciding how the DPCM code, a type of intermediate data after pre-processing, is further compressed. If the image pattern of a compression group of pixels is not complex, the pixel correlation is close and the difference between adjacent pixels will be small and more predictable. The values of DPCM coded pixels will be small and easy to achieve compression rate for the DPCM coded data.

When the image pattern changes sharply, the DPCM values will range abruptly and difficult in taking advantage of continuous small value of DPCM codes, but the MSB bits still have higher potential of smaller difference between pixels. Therefore, separating the MSB from LSB and compressing them separately in complex image pattern achieves shorter code of representing the DPCM coded values. A target pixel 61 goes through the procedure of the DPCM 62 firstly before it is separated to be MSB bits and LSB bits 67 with a certain length, for example 4 bits, of each in MSB and LSB bits.

The variance range of the MSB bits 63 are used to determine whether a group of pixels has high correlation or not, and the MSB and LSB should be coded separately or jointly accordingly. If YES, the DPCM coded group of pixel will be coded without separating the MSB from LSB bits, and if NO, the MSB and LSB of the DPCM coded pixel value will be coded separately 64. When separately compression is decided, both MSB and LSB will be coded by a means of VLC 66 coding. The right bottom of FIG. 6 depicts an example of a group of 8 pixels, the separated MSB and LSB and the means of deciding how to re-order the group of pixels for LSB bits when coding a group of pixels with close correlation or individually for those don't show close correlation. MSB bits are less variable than the LSB bits of the DPCM code within a block. "0" of the MSB of the DPCM code statistically represents smaller value of LSB and higher potential of close correlation between adjacent pixels. The continuous "0" of MSB bits 67 of the DPCM code is therefore used to determine which bits of LSB 68 and re-ordered bits are coded by VLC (Variable Code Compression) coding or by truncation 66. Truncation causes data loss which is needed only when the bit rate of going through VLC compression is out of budgeted bit rate.

Figure 7:
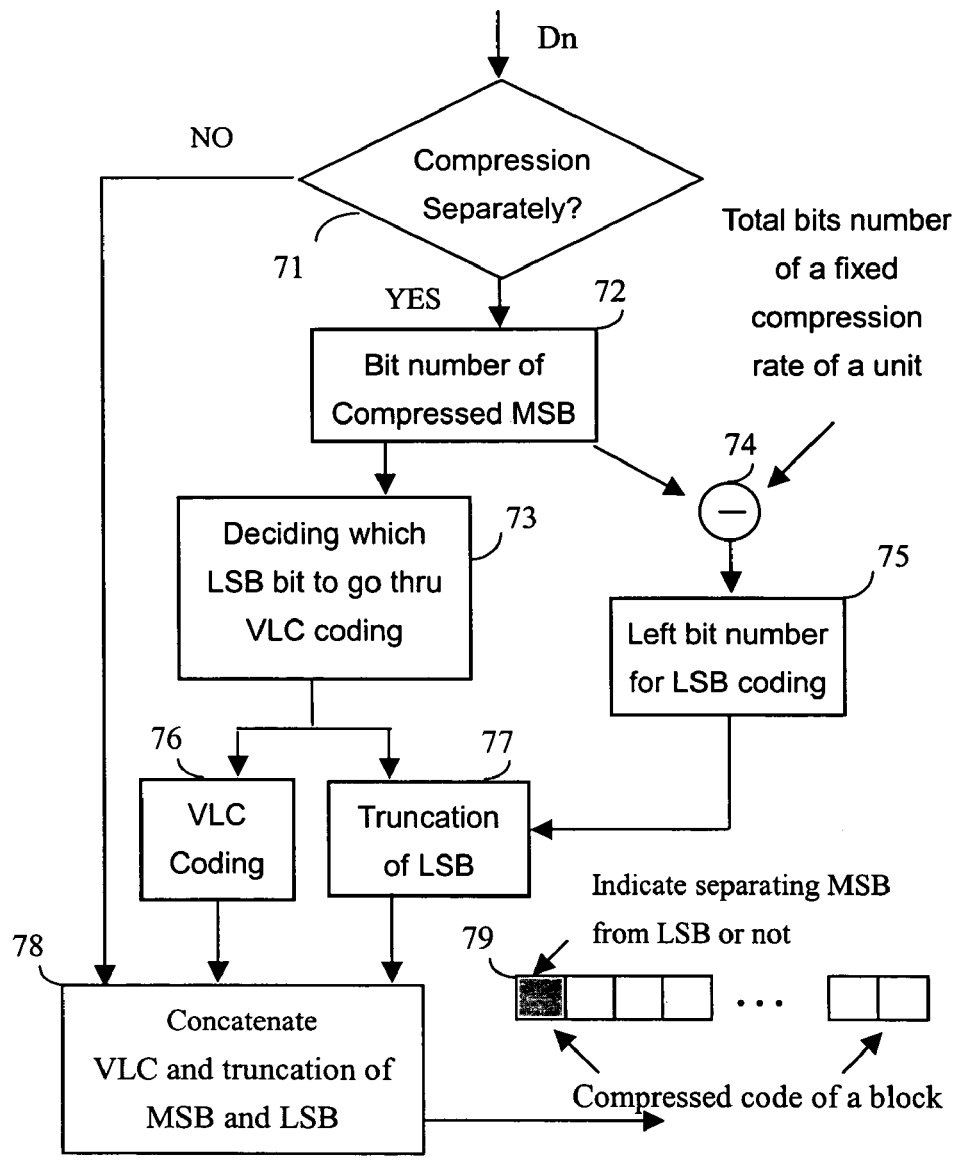
FIG. 7 is another flowchart for illustrating the example of image compression.

FIG. 7 illustrates the compression procedure of the differential values of adjacent pixels. MSB bits of a block of Dn, the DPCM code between adjacent pixels can be screened to determine whether compression of separate MSB and LSB bits can reduce more bits or not. If separating 71 does not gain higher compression rate, the Dn of a group of pixels will be sent directly to go through the VLC coding and possible truncation 78. If separate compression of MSB and LSB saves more bits, the bit number 72 of the compressed MSB bits is subtracted 74 from the total bit number of a fixed bit rate of a block of compression unit and becomes the budgeted amount 75 left for LSB compression. The MSB bits determine which pixel of the LSB bits of DPCM code shall go through VLC coding 73 and which need to go through truncation by examining which MSB of DPCM are "0". All MSB bits and those LSB bits 76 with the corresponding MSB having continuous "0s" shall be compressed together by a kind of VLC coding. The resting LSB bits will be kept as original DPCM value or coded by VLC or by truncation 77. In packing the compressed data, a leading code 79 of a block of compression code indicates whether that block of pixels is coded by separating the MSB and LSB bits or not. In principle, most block gains higher compression rate without wasting code of compression MSB separately. But, blocks with complex patterns, separately compression of MSB and LSB bits gains higher compression rate since MSB bits statistically still demonstrate high correlation.

Figure 10:
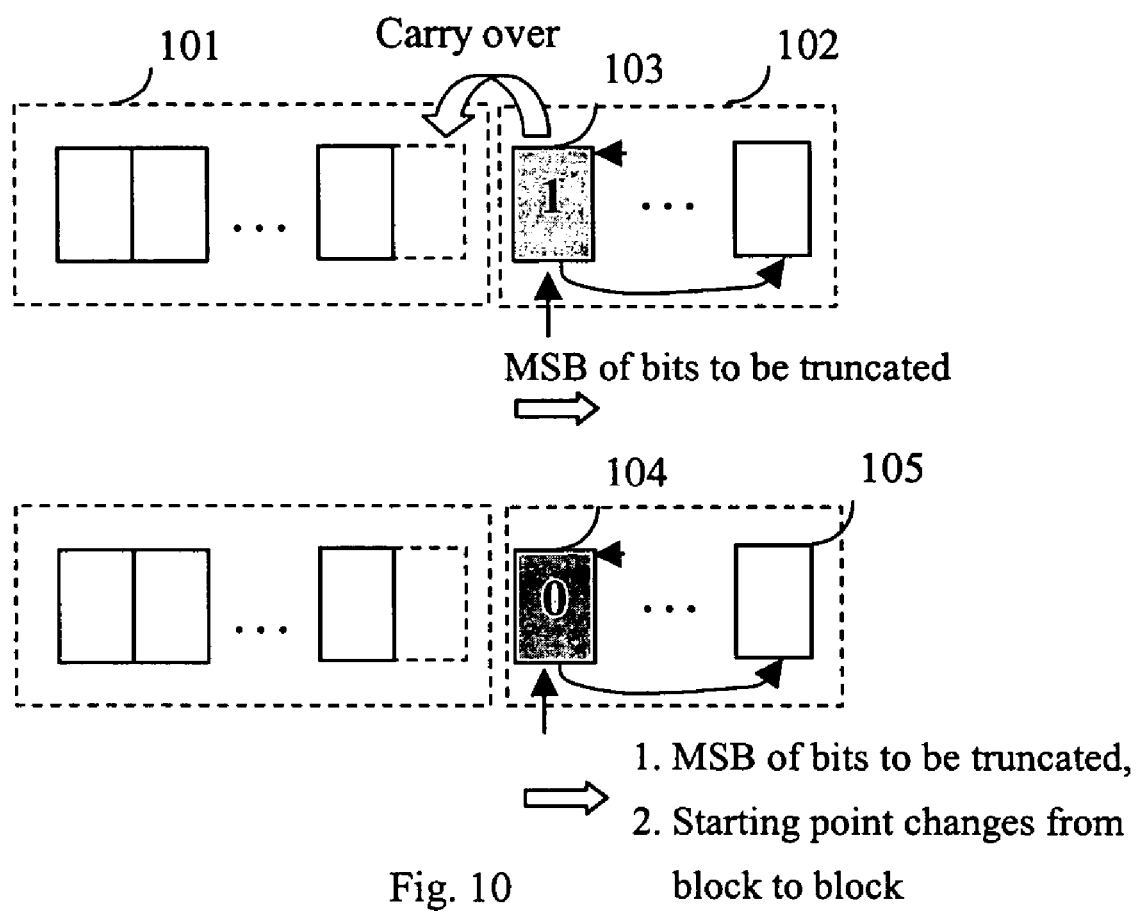
FIG. 10 illustrates a carry-over operation.

To avoid accumulating error from frame to frame caused by truncation, the bits to be truncated will be randomly rotated from block to block over time as shown in FIG. 10.

Figure 8:
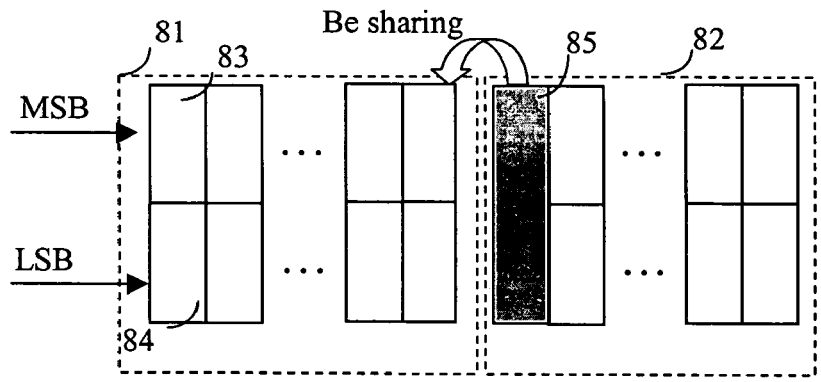
FIG. 8 is a diagram illustrating sharing of same reference value between adjacent blocks.

In the DPCM coding, an MSB bit of a reference pixel 85 is used to be shared by two blocks 81, 82 of compression pixels as shown in FIG. 8. The DPCM coding of left block 81 takes differential values from right pixel to left pixel, while the right block 82 is from right pixel to left Sharing reference pixel saved bit number and achieve higher compression rate or better image quality.

Figure 9:
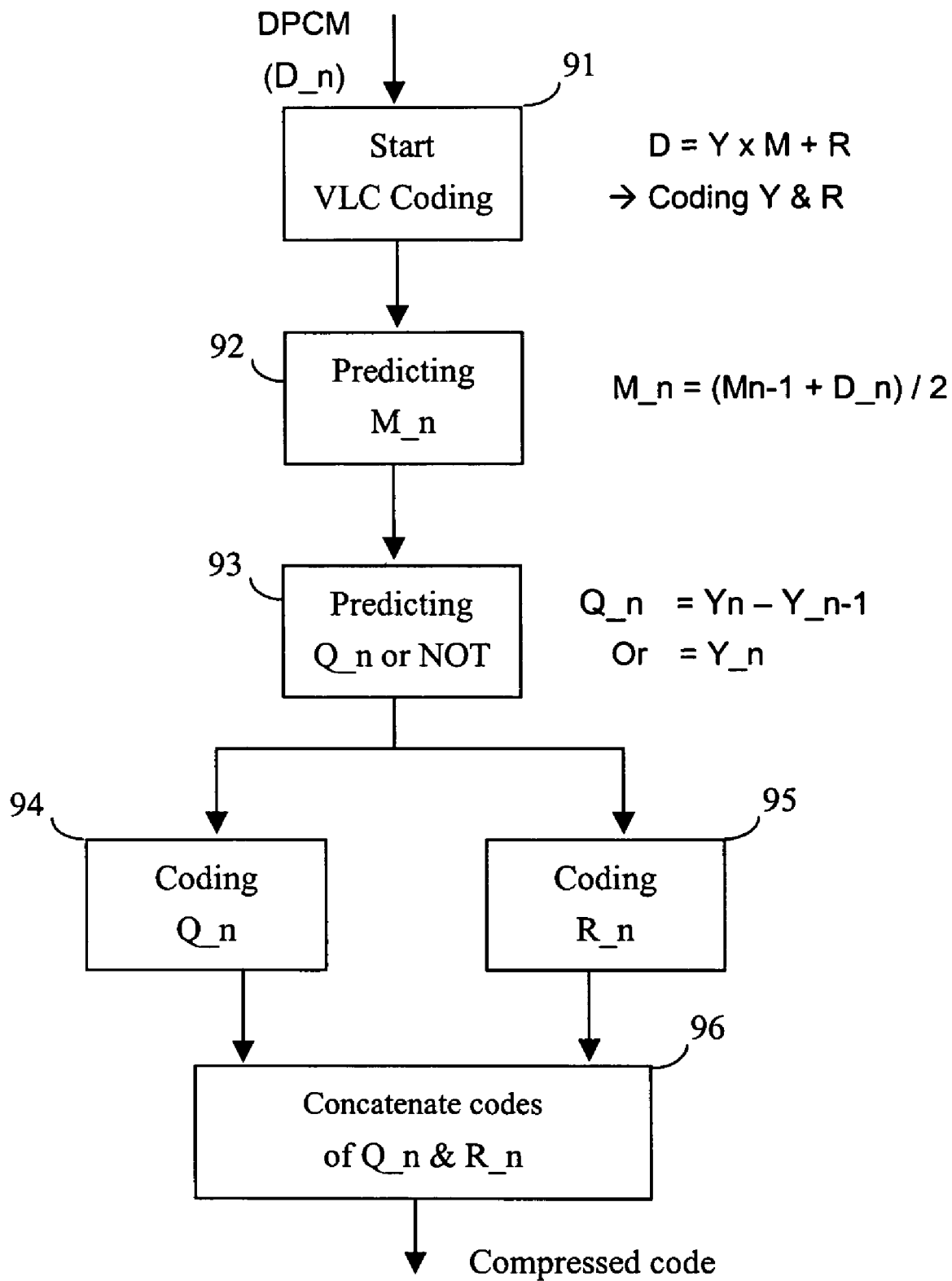
FIG. 9 illustrates a method for compression.

FIG. 9 depicts the flowchart and the principle of the VLC coding applying to the present invention of the reference frame compression. The DPCM coded difference, Dn between adjacent pixels starts the 1st step of VLC coding 91.

$$D\_n = Y \times M + R \quad (Y\text{:Quotient}, M\text{:Divider}, R\text{:Remainder}) \quad \text{Eq. (1)}$$

the "Quotient" and "Remainder" are coded with the "Divider" implicitly done by prediction. For example: $12=2\times 5+2$. In the VLC coding of this invention, the $Y=1$ and $R=2$ are the only two parameters needed to be coded with the $M=5$ implicitly predicted by an average of weighted factors times Ms of previous pixels. 1st step of the VLC coding is to predict the value of M. Eq. (2) illustrates the means of predicting the value of M.

$$M\_n = (Mn-1 + D\_n)/2 \quad \text{Eq. (2)}$$

As one can see that the Dn of the closest previous pixel has highest weight of ½, the next pixel will have a factor of ¼, . . . etc. the farer the pixels, the lower value the weighted factors and less influence to the present pixel in predicting the M.

Since the M can be predicted by calculated values of M 92 of previous pixels, there is no need to store the value of M. The coding of R is based on binary coding. Taking last example, the $R=2$ will be coded by two bits of "10". The Y will be coded by continuous "0" and stopped by adding "1". For instance, $Y=3$ will be coded by 0001. According to an embodiment of the VLC coding of this invention, the Y (Quotient) will be coded by predicted value which means coding Q_n, the difference of quotients of Y_n and Y_n−1 (Q_n=Y_n−Y_n−1). Since the predicted Q_n does not guaranty a shorter code, only being able to achieve shorter code will the means of predicting the Q_n will be applied. A group of Ys will be examined to decide whether the prediction of Q_n makes Q_n 93 code shorter. The final step is to concatenate 96 the predicted and coded Q_n and the R (Remainder of binary code).

Figure 5C:
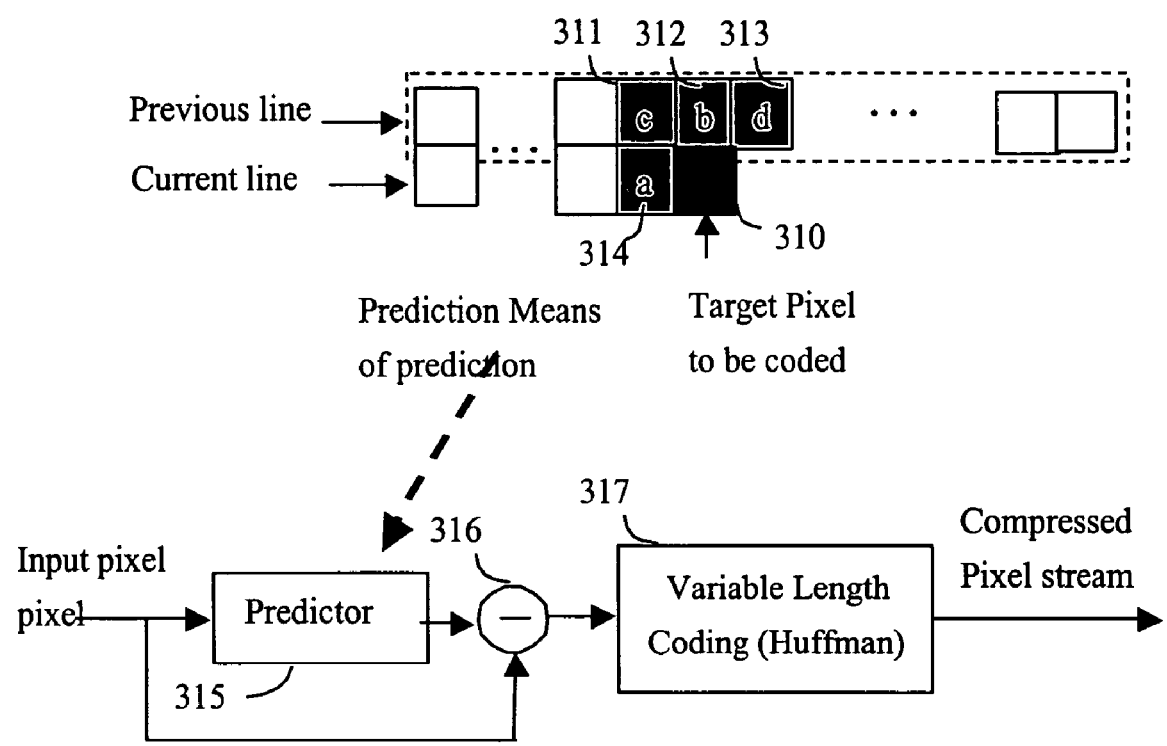
FIG. 5(c) illustrates a method for predicating pixel value in compression.

In the information theory, the more data put together into compression, the higher the compression rate can be achieved by more accurate prediction. The present invention of image compression in display device driver frame buffer compression, applies a couple of surrounding pixels of a top line and the left pixel to predict the value of the targeted pixel. For saving the cost of line buffer, the present invention of image compression when applying to the display device controller, the top line pixels as a reference is optional. FIG. 5(c) illustrates the prediction mode of the present invention of the image compression for the display device driver. A targeted pixel 310 is surrounded by 3 pixels in top line and one left pixel. The predicted value of the targeted pixel is determined by the following equation Predicted value=min. of $(a,b)$ if $c$>max. of $(a,b)$, or max. of $(a,b)$ if $c$<min. of $(a,b)$ or $a+b-\frac{1}{2}(c+d)$, others The above equation means that when top left pixel value, c, 311 is greater than the greater of top 312 and left pixels 314, then, the predicted pixel is set to the smaller of left ad top. When top left pixel value, c is smaller than the smaller of top and left pixels, then, the predicted pixel is set to the greater of left ad top. In other cases, the predicted value is set to the sum of top and left pixels subtracted from the average of top left and top right pixel 313. In implementation, after being used in predicting, the pixel buffers of the top line can be written and be used to store left pixels of the current line with the targeted pixel and over time, only one line buffer with one more left pixel will be needed for prediction.

The above methods have improved the compression rate and quality of the compressed reference frames. Additional two methods are applied to further achieve higher compression rate and from the other hand, to improve the image quality with a fixed bit rate.

Figure 11:
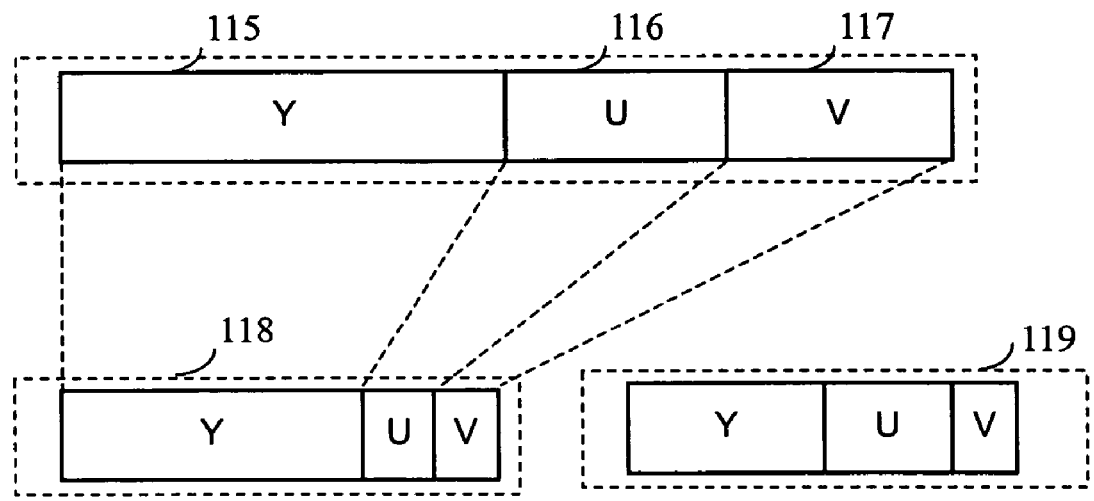
FIG. 11 illustrates a further enhancement by adjusting YUV component compression ratios.

The first is to allow variable compression ratios in different attributes of a color space, e.g. among Y, U and V, within a compression unit with variable compression rate of a unit of compression as illustrated in FIG. 11. A block of pixels 114 comprising for instance 16 pixels (total of 32 bytes) of 4:2:2 Y 115 U 116 V 117 format can be compressed into 12 bytes of Y and 2 bytes of U and 2 bytes of V (final of a total of 16 bytes 118).

Figure 12:
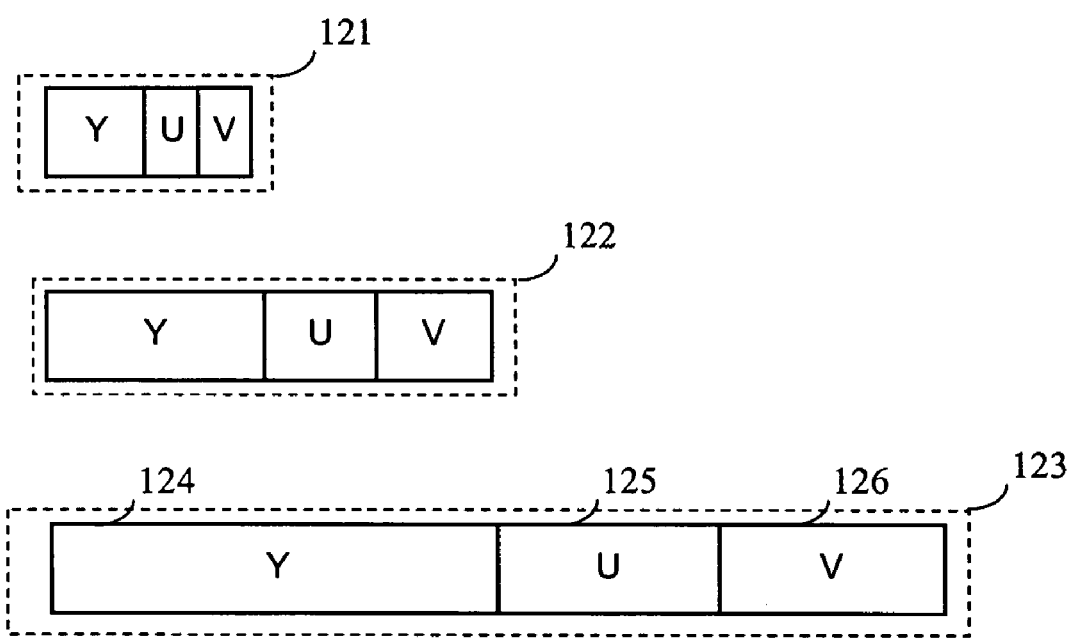
FIG. 12 illustrates a further enhancement by adjusting YUV component compression ratios.

Another method is to adopt different block size in different applications. A block of 16 pixels can also be reduced to 8 bytes of Y and 4 bytes of U and 2 bytes of V (final of a total of 16 bytes 119). Since the more pixels put into a block as a compression unit the higher compression rate one can achieve. FIG. 12 illustrates another method of compression rate and quality enhancement which is a means of adaptively applying variable size of block of pixels. A block of 8 pixels 121, 16 pixels 122, 32 pixels 123 and even long (like 512 pixel per block) are allowed. In some applications, higher performance of encoding and decoding are critical.

Figure 13:
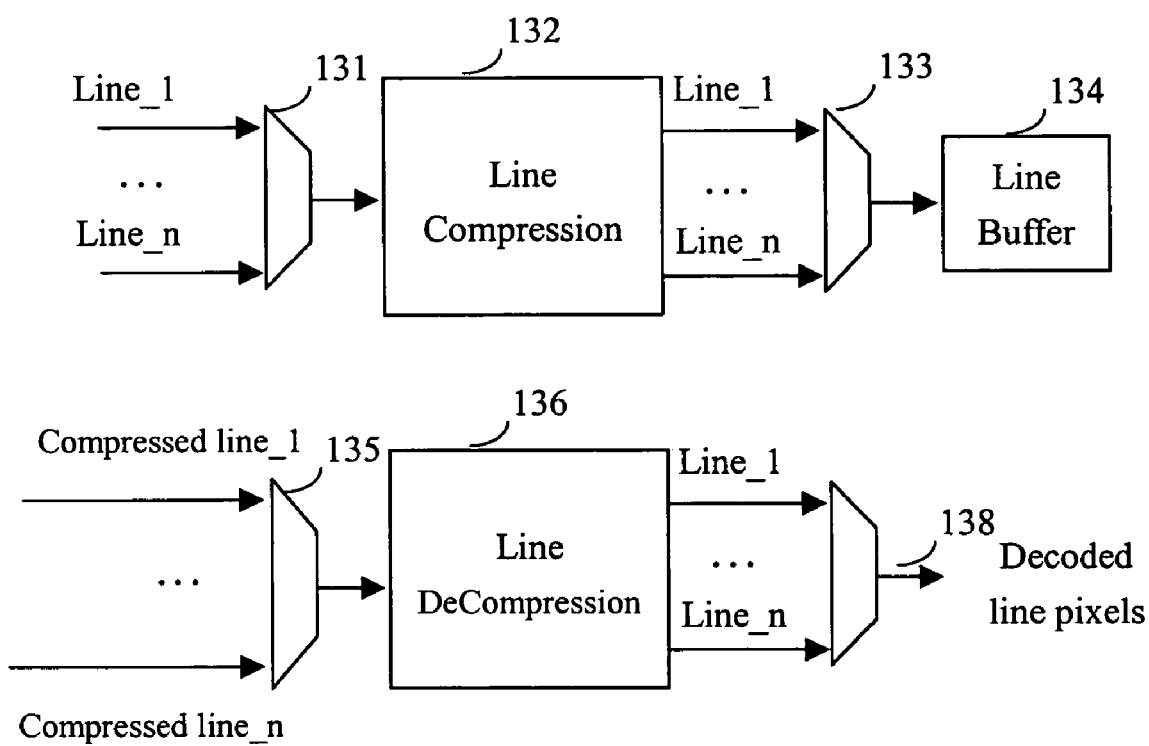
FIG. 13 illustrates a line buffer compression mechanism.

There are a total of 4 to 10 lines of image buffer are designed to function as interpolation of the de-interlacing. The present invention applies to line image compression which easily achieves 15%-25% silicon die area reduction as shown in FIG. 13, a line compression unit 132 receives input of pixels through a multiplexer 131 which selects input from a couple of lines pixels and compresses the line pixels before stores to the reserved line buffer devices 134 through the MUX 133 to allocate the storage space according to the line length and the predetermined compression ratio. In another side, the line decompression unit 136 recovers the compressed line buffer data through the MUX 135 to be image data 138.

Figure 14:
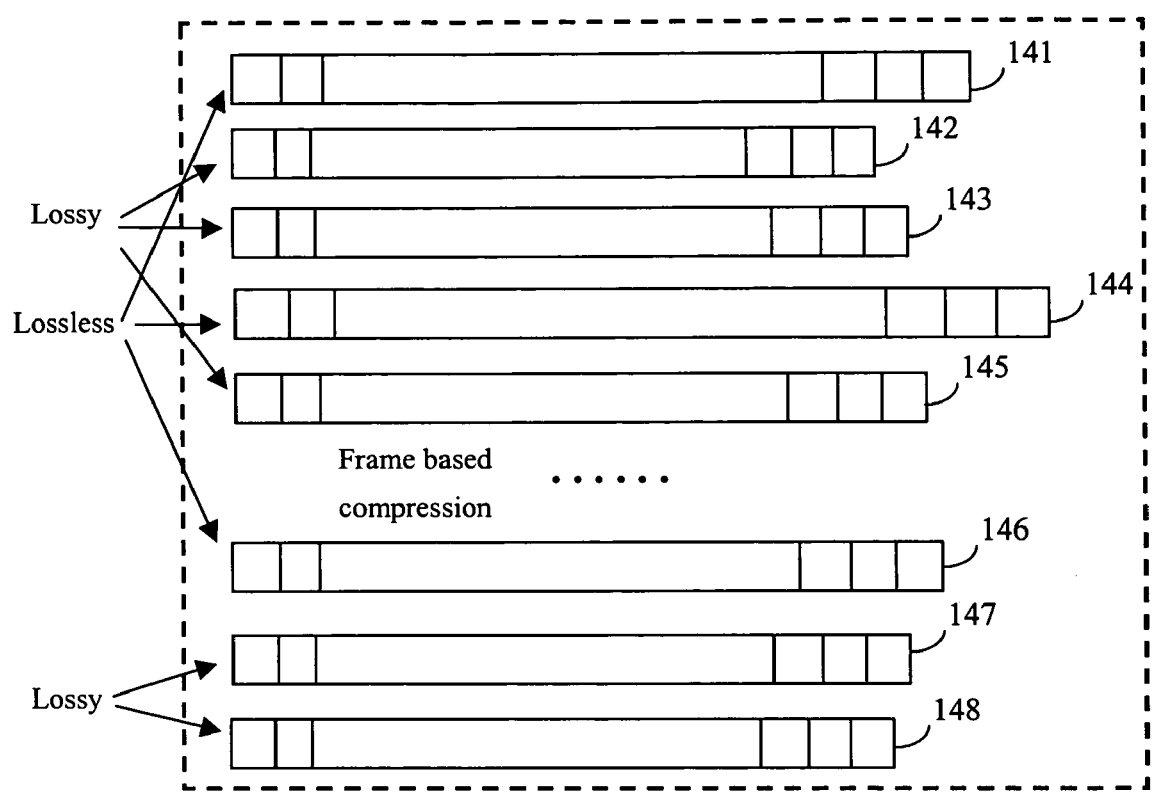
FIG. 14 illustrates fixed compression ratio by dividing an image into areas.

In most applications, the compression rate is determined for achieved a fixed image buffer size reserved for the worst case of compression rate. To take advantage of larger pixels number as a compression unit, the present invention applying to the display device driver design uses a frame as a compression unit. FIG. 14 illustrates the conceptual block diagram of frame based compression which is applicable in the frame buffer compression especially in display device driver. Due to the difficulty of predicting the compression rate of each line or each sector of pixels, a lossless compression is applied to a certain of line 141, 144, 146 as references in the next lines 142, 143, 145 and 147, 148 individually since statistically, the compression rate of adjacent lines will not varies abruptly. A counter is applied to calculate and trace the compression rate of each line of a frame of pixels to ensure the fixed compression rate. When the accumulated compression rate of a certain of lines reached a value behind a preset threshold, higher compression rate will be applied to the next line or a couple of lines to gradually pull back the compression rate over time. Another embodiment of this invention of compressing a frame image buffer is that during compressing the 1st line image with lossless compression algorithm, the bit rate of each block of image is used to be the reference of the corresponding block of the next line. Each line image with fixed compression rate of lossy algorithm can be used as reference of the next line. This mechanism repeats till the end of a frame.

Figure 15:
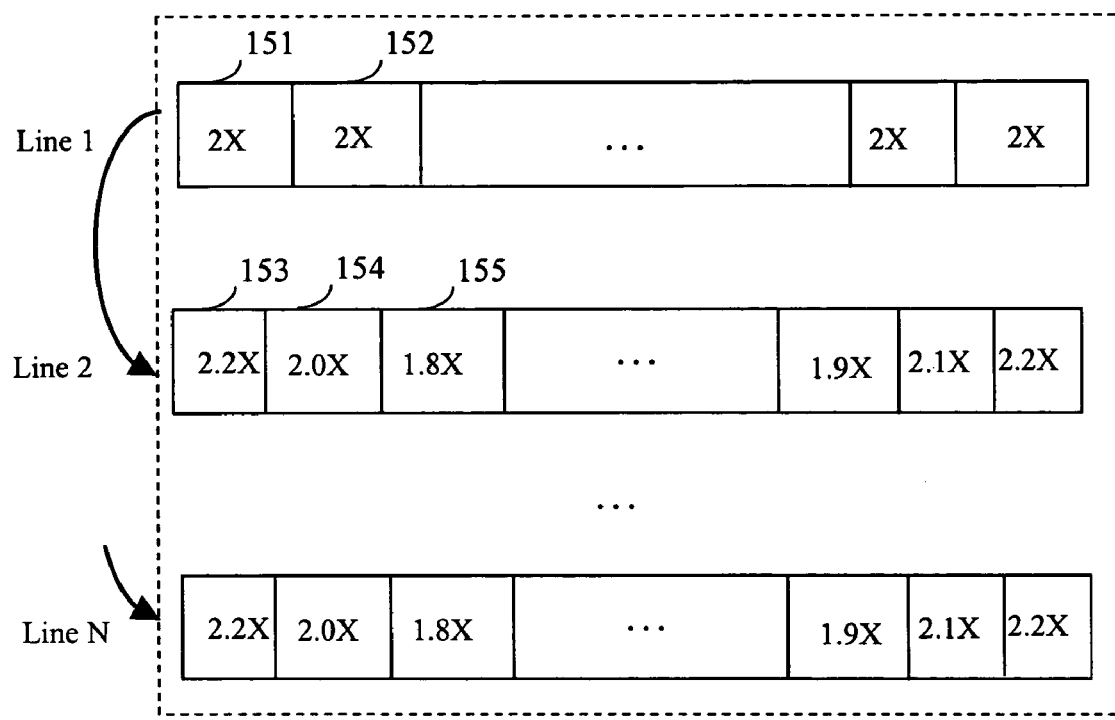
FIG. 15 illustrates dynamically changes the compression ratio by reference to blocks of adjacent lines.
Figure 16:
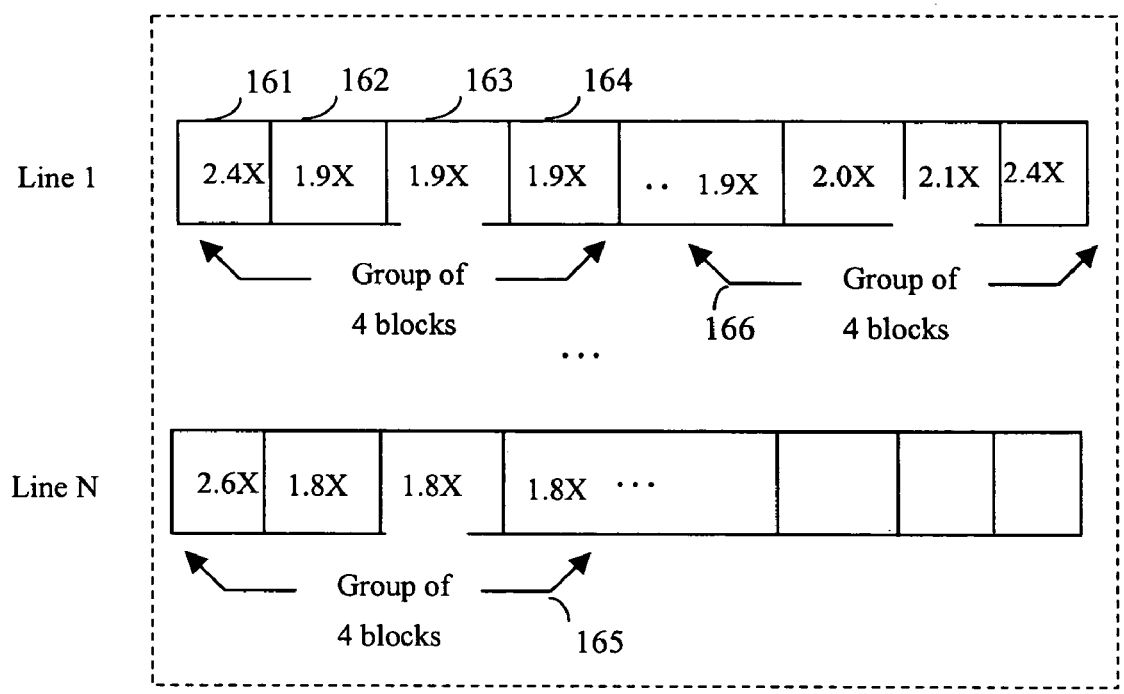
FIG. 16 illustrates line buffer compression with a total fixed compression ratio.

In some display device controller designs, reading and writing a complete line is the most common operation during scaling and de-interlacing, the line based compression mechanism as shown in FIG. 15 is an embodiment of this invention of reducing line image data. Similar to the frame based compression, knowing the compression rate of each block or said the bit allocation for each block plays critical role of determining the image quality of a compressed line. According to an embodiment of this present invention of the line based image compression, the 1st line of a frame of image is compressed with a fixed compression rate (or said bit rate) for each block, for instance a fixed compression rate of 2.0× 151, 152. The difference of the original image and the compressed image of each block are saved into a register to be the reference of determining the compression rate of each block 153, 154,155 of next line. In principle, blocks by the edge of a picture have higher compression rate and blocks near center will have lower compression rate. In some applications, a line based compression can compress with no reference other than itself, and an embodiment of this invention of the line based compression uses a group of blocks with predetermined compression rate as a compression unit as shown in FIG. 16. A certain block 161 within a group can be compressed by a lossless compression algorithm with a certain bit rate, and the rest bit rate of a group of blocks can be evenly 162, 163, 164, 165 or gradually 166 distributed by other blocks. If gradually distributed by other blocks, the compression rate of each block can be predetermined by a statistic measurement.

It will be apparent to those skills in the art that various modifications and variations can be made to the structure of the present invention without departing from the scope or the spirit of the invention. In the view of the foregoing, it is intended that the present invention cover modifications and variations of this invention provided they fall within the scope of the following claims and their equivalents.

What is claimed is:

1. An apparatus for compressing a raw image, comprising:
    a device partitioning a raw image into a plurality of lines with each line having a plurality of blocks and each block having a plurality of pixels;
    a device performing a pre-processing on the raw image with a frame codec device to generate an intermediate data that has higher resemblance than the raw image; and
    an image compression device reducing the data amount of the pre-processed raw image.

2. The apparatus of claim 1, wherein in the pre-processing, a first color attribute of each pixel is subtracted by a second color attribute of each pixel when generating the intermediate data.

3. The apparatus of claim 1, wherein in the pre-processing, differential values among adjacent pixels are used to generate the intermediate data.

4. The apparatus of claim 1, wherein in the pre-processing, differential values among adjacent pixels are used to generate the intermediate data.

5. The apparatus of claim 1, wherein the image compression codec device has a mechanism of separating MSB portions and LSB portions of the intermediate data for compression during compressing the raw image.

6. The apparatus of claim 5, wherein the image compression codec device determines whether to separate the MSB portions and the LSB portions of the intermediate data by checking the variance of the MSB portions.

7. The apparatus of claim 5, wherein units in the LSB portions are regrouped based on associated units in the MSB portions for compression.

8. The apparatus of claim 5, wherein a number of units of the LSB portions are truncated depending on a compression ratio of associated MSB portions to achieve a predetermined total compression ratio of the LSB portions and the MSB portions.

9. The apparatus of claim 8, wherein a carry-over operation to the MSB portions associated to the LSB portions is performed, where the LSB portions have units to be truncated if units of LSB portions to be truncated exceed a carry-over threshold.

10. The apparatus of claim 8, wherein the truncated units of each LSB portions are selected in a rotated order.

11. The apparatus of claim 1, wherein a total compression ratio of the raw image is predetermined and during the compression, a compression ratio of each block of the raw image is adapted dynamically to achieve the total predetermined compression ratio of the raw image.

12. The apparatus of claim 11, the raw image is divided into a plurality of areas and in each area, a referencing line in each area is selected to be compressed under a lossless compression means and compression ratios of lines other than the reference line in each area are adapted to make each area achieve the final total compression ratio under a lossy compression that refers to the compression result of the referencing line with lossless compression mean.

13. The apparatus of claim 1, further comprising a line compression codec device and at least one line buffer device, wherein the line compression codec device instantly compresses and decompresses one line pixels used by the manipulating device.

14. The apparatus of claim 13, a compression ratio of each block of the line data refers to the data amount of an associated block of another line data compressed by the line codec device previously.

15. A device of compressing a raw image, comprising:
a device performs a pre-processing on the raw image to generate an intermediate data that has higher resemblance than the raw image;
a storage device temporarily saving the intermediate data of a plurality of lines with each line having a plurality of units associated to pixels of the raw image;
a counting device calculating a weighted summation of a plurality of units of the intermediate data adjacent to an unit to be compressed; and
a coding engine calculating a quotient and a remainder so that the unit to be compressed equals to the quotient multiplies a divider plus the remainder; and the quotient and the remainder are used for compression.

16. The apparatus of claim 15, wherein the divider is calculated by the following function:

$Mn=(Mn-1+Dn)/2$ where Dn is the value of an unit of the intermediate data indexed with n, and Mn is the associated divider of Dn.

17. The apparatus of claim 15, wherein the image frame compression codec device performs a pre-processing on the raw image to generate an intermediate data that has higher resemblance than the raw image; the intermediate data has a plurality of lines, each line has a plurality of units associated to pixels of the raw image; the image frame compression codec device calculates a quotient and a remainder so that the unit to be compressed equals to the quotient multiplies a divider plus the remainder, and the quotient and the remainder are used for compression; the divider is determined as the smaller value of the left unit and the top unit if a target unit is larger then the left unit and the top unit, determined as the larger value of the left unit and the top unit if the target unit is smaller than the left unit and the top unit, and determined as the left unit plus the top pixel minus an average of the left-top unit and the right-top unit if the target unit, the top unit and the left unit do not satisfy the above two situations.

18. The apparatus of claim 15, wherein the frame codec device rotates the raw image if the raw image has higher resemblance in Y-axis than in X-axis.

19. A method for compressing image data, comprising:
using a traversing device for traversing the image data line by line and pixel by pixel, wherein the pixel being currently traversed is a target pixel;
using a device for determining a predicated value of the target pixel by reference to a left pixel, a left-top pixel, a top pixel, and a right-top pixel those are adjacent to the target pixel; and
using a decomposing device for decomposing the target pixel as a predication polynomial of the predicated value and at least two parameters; and
utilizing the parameters for coding the target pixel.

20. The method of claim 19, wherein the predication polynomial is:

$D=Y \times M+R$, where M is the predicated value, Y and R are the two parameters.

21. The method of claim 19, wherein the predicated value is determined as the smaller value of the left pixel and the top pixel if the target pixel is larger than the left pixel and the top pixel, determined as the larger value of the left pixel and the top pixel if the target pixel is smaller than the left pixel and the top pixel, and determined as the left pixel plus the top pixel minus an average of the left-top pixel and the right-top pixel if the target pixel, the top pixel and the left pixel do not satisfy the above two situations.

* * * * *